June 21, 1932.  A. O. MOE  1,864,085

FRUIT WASHING APPARATUS

Filed March 24, 1928  6 Sheets-Sheet 1

June 21, 1932. A. O. MOE 1,864,085
FRUIT WASHING APPARATUS
Filed March 24, 1928 6 Sheets-Sheet 3

INVENTOR
A. O. Moe
BY
ATTORNEY

WITNESSES
H. T. Walker

June 21, 1932. A. O. MOE 1,864,085
FRUIT WASHING APPARATUS
Filed March 24, 1928   6 Sheets-Sheet 4
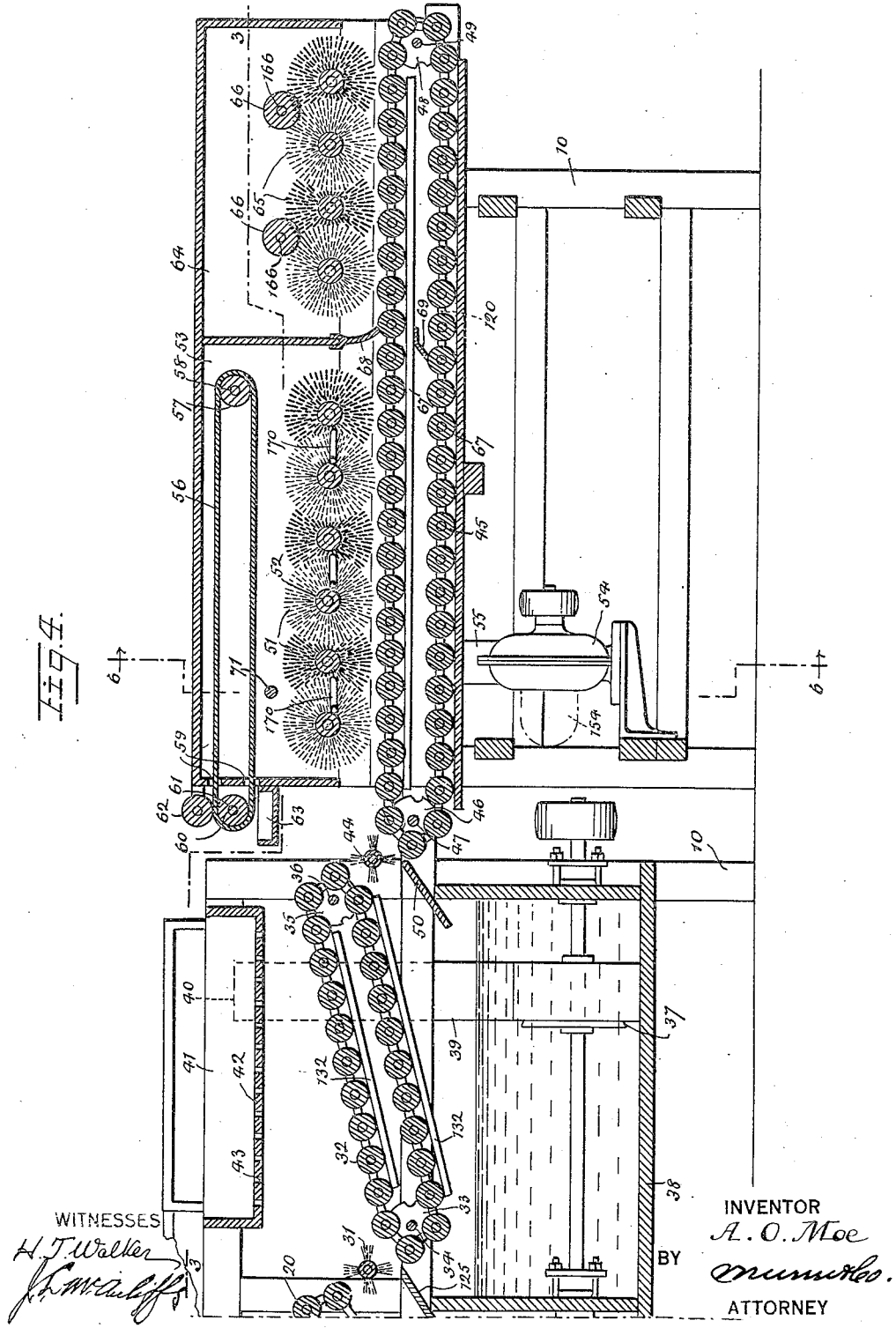
INVENTOR
A. O. Moe
BY
ATTORNEY June 21, 1932. A. O. MOE 1,864,085
FRUIT WASHING APPARATUS
Filed March 24, 1928  6 Sheets-Sheet 5
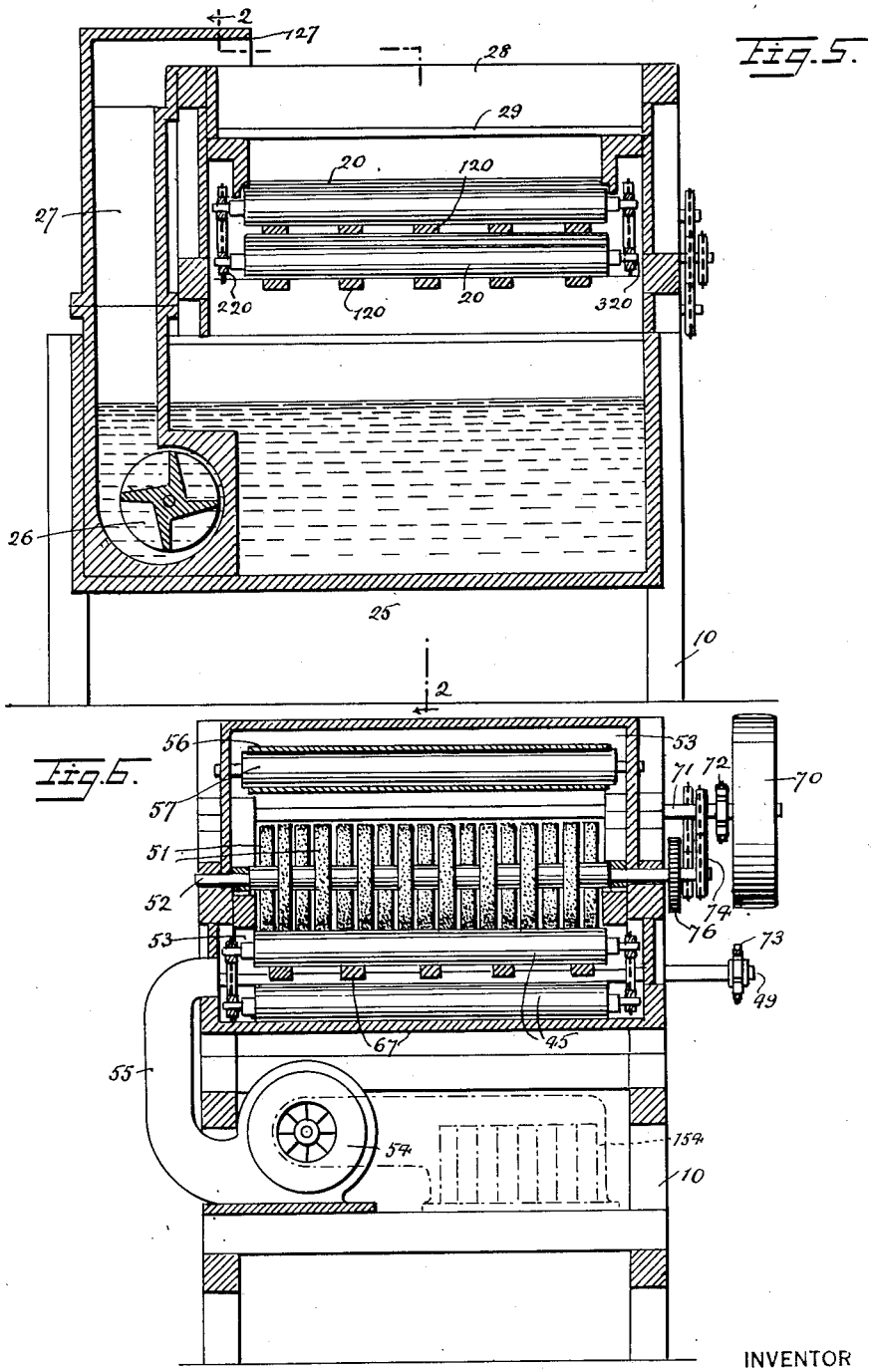

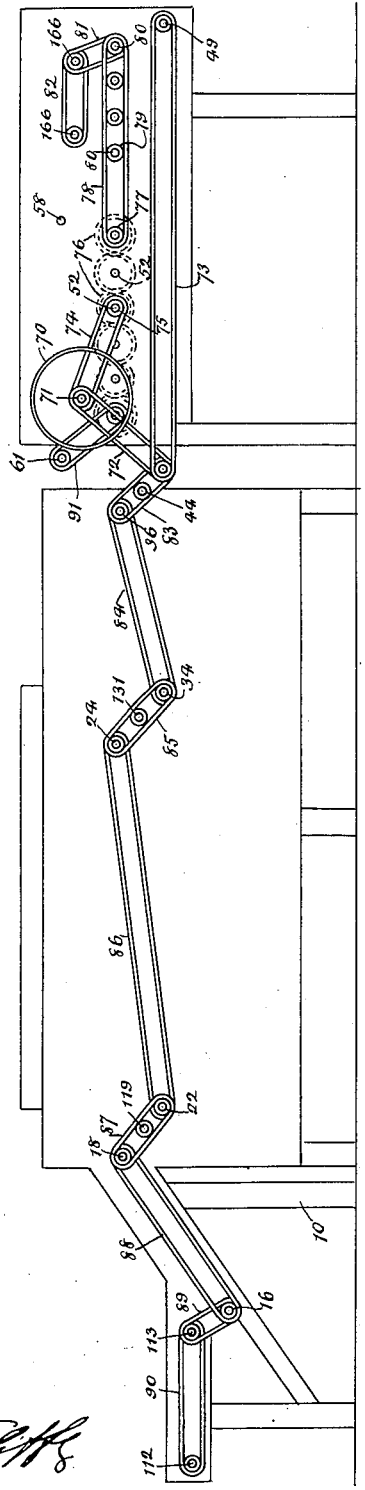

Patented June 21, 1932

1,864,085

UNITED STATES PATENT OFFICE

ANDREW O. MOE, OF TOPPENISH, WASHINGTON, ASSIGNOR TO FOOD MACHINERY CORPORATION, OF SAN JOSE, CALIFORNIA, A CORPORATION OF DELAWARE

FRUIT WASHING APPARATUS

Application filed March 24, 1928. Serial No. 264,286.

My invention relates to an apparatus for washing fruit, and rinsing the fruit after the application of the washing liquid to remove said liquid, and comprises also a means to apply wax to the fruit.

The general object of my invention is to provide a novel and effective means for washing, rinsing and waxing fruit, and so arranged that a weak solution of acid will be effective in the cleansing operation.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 4 is a longitudinal section of the right half of the machine along substantially the same line as for Fig. 2;

Figure 5 is a transverse vertical section on the line 5—5 of Figure 2;

Figure 6 is a transverse vertical section on the line 6—6 of Figure 4;
Figure 7 is a diagrammatic side elevation of the machine given to show one drive means that may be employed;

Figure 8 is a detail in plan view with parts broken out and sectioned, the view being given to show the drive chain and roller assemblage;

Figure 9 is a transverse vertical section of the parts shown in Figure 8.

Figure 1:
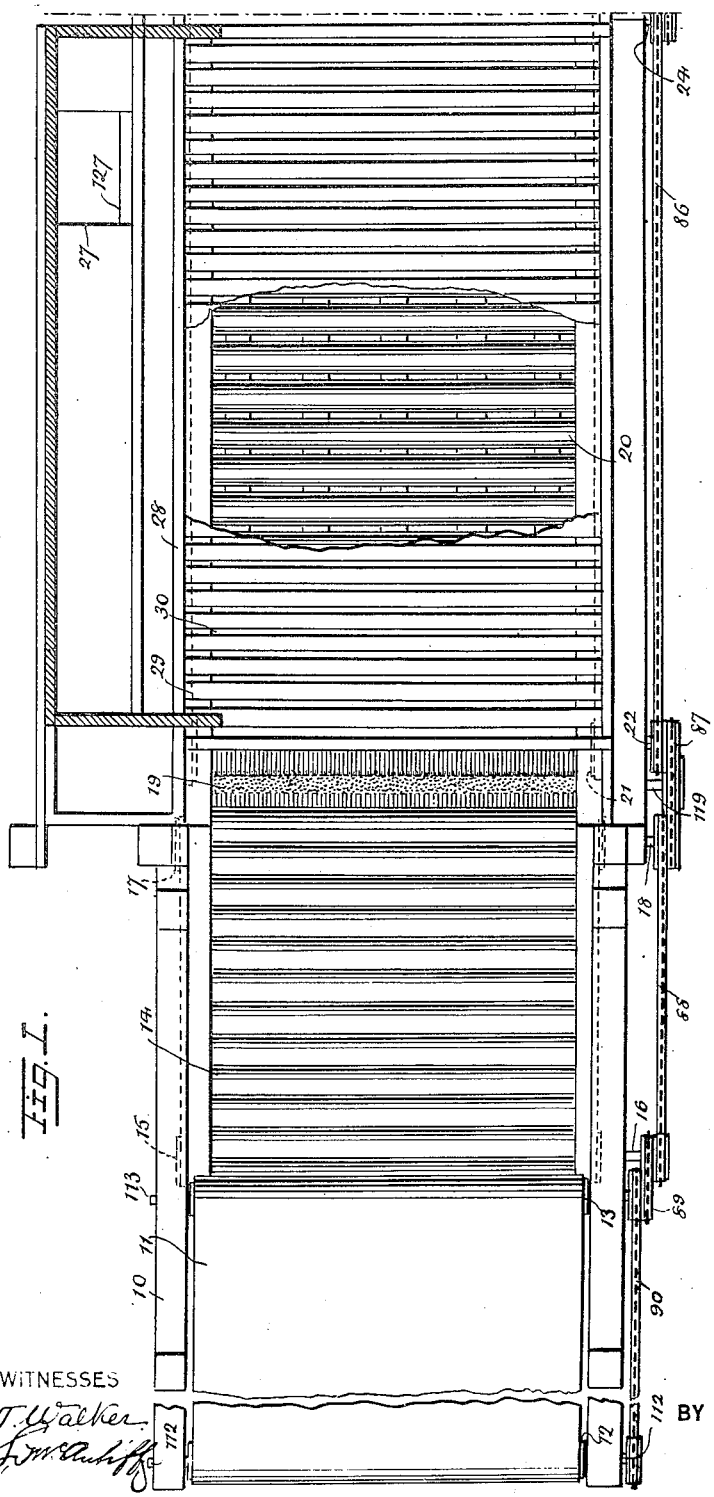
Figure 1 is a plan view of an apparatus embodying my invention, parts being broken away.
Figure 2:
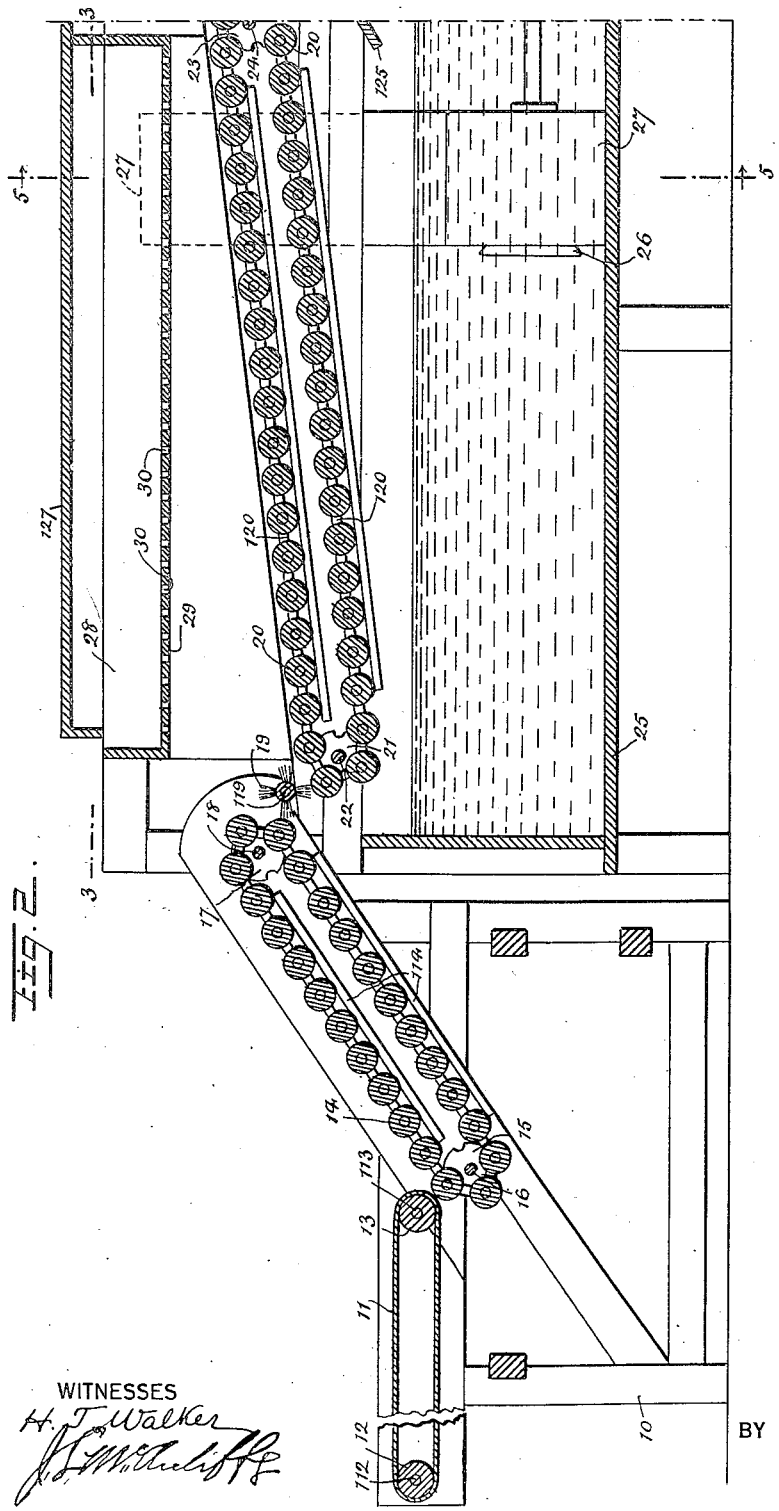
Figure 2 is a longitudinal vertical section of the left half of the machine, the section being taken on the line 2—2 indicated in Figure 5.

In carrying out my invention in practice in accordance with the illustrated example, a suitable frame designated generally by the numeral 10 is constructed. At the feed end of the machine a conveyor means is provided, preferably an endless conveyor belt 11 running over pulleys 12 and 13 on shafts 112 and 113 respectively. The belt 11 delivers the fruit to an endless series of rollers 14 running over sprockets 15 and 17 mounted on shafts 16 and 18 respectively. The endless series of rollers 14 constitute an elevator from the top of which the fruit is discharged and advantageously to a transfer revolving brush 19 on a shaft 119.

A conveyor is provided in the shape of an endless series of rollers 20, to which conveyor the fruit is delivered by revolving transfer brush 19, said conveyor running at one end over a sprocket wheel 21 on a shaft 22, and at the other end over a sprocket wheel 23 on a shaft 24. The numeral 120 indicates supporting slats for both runs of the endless series of rollers 20. The numeral 125 indicates a deflector board disposed adjacent the top of the acid tank 25 near that end of the conveyor 20 opposite the receiving end, said deflector board extending beneath the brush 31 to deflect liquid dripping from said brush back to the tank 25.

Beneath said endless conveyor, made up of rollers 20 in the illustrated example, is a tank 25 which in practice holds a weak solution of acid. From the outlet 127 of the upwardly extending discharge flume 27 of a pump 26 in tank 25 the acid solution from the tank 25 is delivered to an overhead distributing tank 28, the bottom of which is composed of slats 29 or equivalent openwork structure, to provide outlet discharge openings 30 for the downflow of the washing solution pumped from tank 25.

From the conveyor 20 the fruit is delivered after subjection to the cleansing acid or equivalent liquid to a washing assemblage. The fruit passes from the conveyor 20 to a transfer device in the form of a revolving brush 31, the fruit finally passing to the second conveyor 32 above a water tank 38 hereinafter more particularly referred to. The second conveyor comprises in practice an endless series of rollers 32 disposed on an incline. Said endless series of rollers pass about at the lower end a sprocket 33 on a shaft 34, and at their upper end about a sprocket 35 on a shaft 36. A pump 37 is provided in the water tank 38, the pumped washing water passing through the uptake flume 39 to the discharge outlet 40 of said flume from which the water flows into the overhead water distributing tank 41. The major area of the tank 41 permits the downflow of water therefrom, the arrangement in practice preferably consisting of slats 42 and intervening slots or openings 43.

From the conveyor composed of the endless series of rollers 32 the fruit passes at the upper end of said conveyor to a drying assemblage. Said drying assemblage includes an endless conveyor composed in practice advantageously of an endless series of rollers 45 which pass at one end about a sprocket 46 on a shaft 47 and at the other end about a sprocket 48 on a shaft 49. The revolving transfer brushes 19 and 31 prevent injury to the fruit in passing from the conveyor 14 to the conveyor 20 and from the conveyor 20 to conveyor 32, and similarly I provide another revolving transfer brush 44 to prevent injury to the fruit when passing from the conveyor 32 to the conveyor formed of rollers 45.

The numeral 50 indicates an inclined water board disposed at the upper edge of the water tank 38 at one side and extends to a point to receive the water collected on the revolving brush 44 and directs the same into the water tank 38, the purpose being to prevent as far as possible the passage of moisture into the drying assemblage. The drying assemblage, in addition to the conveyor means represented by the rollers 45, provides brushes for subjecting the fruit to a brushing action, there being a multiplicity of revolving brushes 51 on shafts 52, the said brushes being disposed above the working upper run of the conveyor 45.

Drying air is forced into the drying chamber 53 in which the brushes 51 are disposed by an air pump 54, the discharge pipe 55 of which delivers the drying air to the chamber 53. The air passing to tube pump 54 may be heated by any suitable means, there being conventionally indicated in Figure 6 an electric heating unit 154.

I provide means to collect and carry out of the drying chamber 53 the moisture collected by the brushes 51, for which purpose an endless belt 56 is disposed horizontally above the several brushes 51 and runs at one end over a pulley 57 on a shaft 58. At the other end the belt 56 runs through slots 59 in the adjacent end wall of the drying chamber 53 and runs about a roller 60 on a shaft 61. The belt before passing about the pulley 60 passes beneath a squeezing roller 62 so that water will be squeezed from the belt 56 and will fall into trough 63 or other collecting means.

From the drying assemblage the fruit passes directly to a waxing assemblage formed partly by the conveyor 45. Adjacent to the drying chamber 53 is a chamber 64 containing several rows of overlapping brushes 65, beneath which brushes the conveyor rollers 45 pass. The brushes 65 are waxing brushes and in order to apply the wax to the same for application to the fruit carried by conveyor 45 I provide a suitable waxing means.

The arrangement in practice consists of revolving rollers 66 on shafts 166 formed of wax and in contact with the brushes 65 so that the brushes will brush the wax from the rollers and deposit it on the brushes 65, where the fruit is subjected to the waxing operation. In traveling through the drying chamber 53 and through chamber 64 for the waxing operation the rollers 45 are supported by any suitable supporting members 67 on the frame 10.

At the entrance to the chamber 64 I provide means to exclude as far as possible the heat from chamber 53 entering chamber 64, there being shown for this purpose a flexible flap or apron 68 above the rollers 45 at the entrance to chamber 64, and a flexible flap or apron 69 between the runs of the conveyor to minimize the space afforded for the entrance of the rollers 45 to the chamber 64 and their return.

With the described construction the fruit is placed manually or by any suitable feed means on the endless feed apron or belt 11 and by said belt is delivered upwardly by the conveyor 14 to the transfer revolving brush 19, from which the fruit falls to the lower end of the inclined endless conveyor 20 to be delivered to a second transfer revolving brush 31, and thence to the inclined conveyor 32 at the top of the water tank 38.

As the fruit is carried along the conveyor 20 the pump 26 discharges an acid solution or other cleansing liquid from the tank 25 to the tank 28, the cleansing liquid escaping through the openings 30 in the bottom of said tank 28 and is flooded gravitationally on to the fruit carried along by the conveyor 20.

The fruit in being carried along by the conveyor 32 is subjected to the action of rinsing water from the tank 38 by reason of pump 37 discharging water to the tank 41 from which the washing or rinsing water is flooded gravitationally from the openings 43 on to the fruit on conveyor 32.

The cleansed and washed fruit now passes to the conveyor 45 (cushioned by brush 44) to be carried along first through the drying assemblage and then through the waxing assemblage. Thus in entering chamber 53 the fruit on conveyor 45 is subjected to the action of the brushes 51 which brush the moisture remaining on the fruit and by centrifugal force thrown upwardly against the under side of the moisture collecting belt 56, said belt traveling first upwardly about the rollers 57 and from thence the upper run of the belt 56 with moisture thereon passes between roller 60 outside of chamber 53 and the squeezing roller 52 so that the water drops to the collecting trough 63 or any suitable receiver.

The cleaned and dried fruit now passes between the flaps 68, 69 into the chamber 64 where it is subjected to the action of the brushes 65 which take up wax from the wax rollers 66 and apply the same in an extremely thin layer to the fruit. While the fruit is in the drying chamber 53 the pump 54 supplies the drying air.

The numeral 170 indicates sinuously disposed rubber covered wires between each row of adjacent overlapping brushes 51, the function of the wires 170 being to engage the bristles of the brushes 51 and bend the bristles backward into a curved form, so that the centrifugal force developed by the reacting bristles will throw any moisture picked up by the brushes against the moisture-collecting belt 56.

Figure 3:
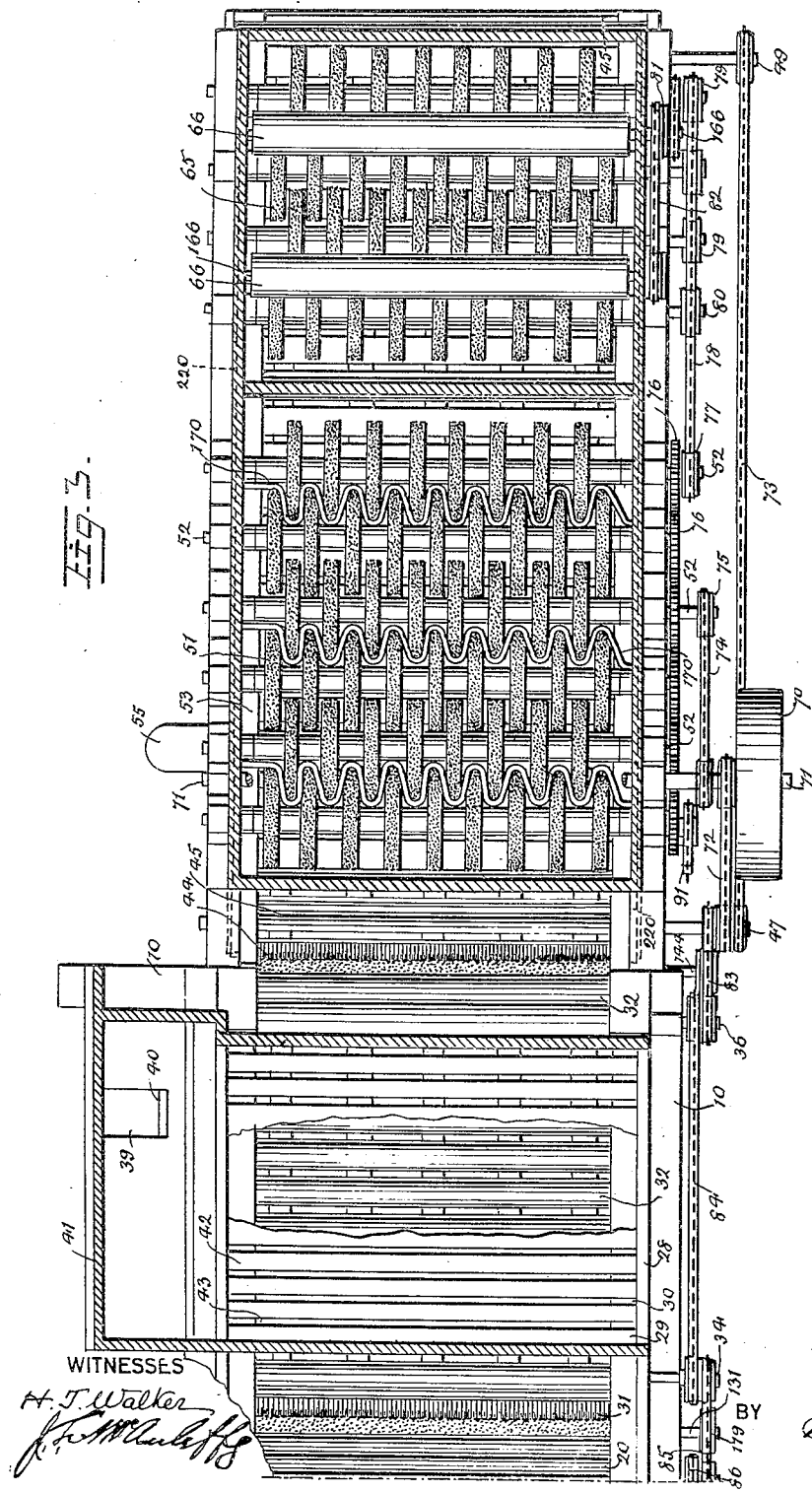
Figure 3 is a horizontal section on the line indicated by 3—3 in Figure 2.

Any suitable drive mechanism may be adopted. For purposes of illustration I have indicated (see Figures 3 and 7) a drive pulley 70 on a drive shaft 71 extending transversely through the machine, as shown in cross section in Figure 3. From a pulley on the shaft 71 is driven an endless drive chain 72 running to a sprocket pulley on the shaft 47, from which shaft 47 runs a drive chain or belt 73 to a sprocket pulley on shaft 49 of the drive for the conveyor 45. Thus said conveyor 45 is driven by the chain 73. From a second pulley on shaft 71 also is driven a belt 74 running over a pulley 75 on the extension of one of the shafts 52 of brushes 51. On said extension of said shaft 52 is the first pinion 76 of a train of toothed pinions on the respective shafts 52 so that said brushes 51 are all positively driven. From a pulley 77 on one of the shafts 52, driven as described, is driven a belt 78 which runs over a series of sprocket pulleys 79 on the respective shafts 80 of the brushes 65 for driving said brushes 65. A short belt 81 runs from a pulley 79 on the end shaft 80 to a pulley on the shaft 166 of one of the wax rollers 66. A belt 82 runs from a pulley on one shaft 166 to a pulley on the other shaft 166.

To revert to the drive elements associated with shaft 47, suitable drive elements run from said shaft 47 to the drive of the feed apron 11. This belt 83 is driven from said shaft 47 and runs over a pulley on the shaft 36 driving said shaft 36, and a second pulley on shaft 36 is driven by belt 84 running over a pulley on the shaft 34 for driving the latter. Also on the shaft 34 is a drive sprocket over which a belt 85 runs to a pulley on the shaft 24. From the pulley on the shaft 24 also runs a long belt 86 which also runs over a pulley on the shaft 22 driving said shaft 22. A belt 87 runs from a driven pulley on the shaft 22 to a driven pulley on shaft 18, and from a driven pulley on the shaft 18 runs a belt 88 to a pulley on the shaft 16, and from a second pulley on shaft 16 runs a belt 89 to a pulley on the shaft 113 of apron 11. From a pulley on the shaft 113 a belt 90 runs to a pulley on the shaft 112.

The numeral 220 indicates a chain belt connecting the several conveyor belt rollers 20, the end extension 320 of each roller 20 running to a certain link of the chain 22.

By the described apparatus the cleaning of the fruit or vegetables is effected by unsprayed water, that is, by flooding or causing the cleaning liquid to discharge gravitationally onto the fruit or vegetables. The expression "flooding of the water on to the fruit or vegetables" is here employed to distinguish from sprayed water or water from jets, and may be effected by any suitable means such as a tank with outlet openings in the bottom. It will be understood that a tank with an open bottom or equivalent means may be produced in any suitable manner, as by slotting, perforations or spaced slats and that the material of the tank may be varied.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Applicant's copending application Ser. No. 380,391 is a division of this application and claims matter not claimed herein.

I claim:

1. In a machine of the class described, means to cause the fruit to travel, means to direct cleaning liquid to the fruit while on the first traveling means, and a drying assemblage adapted to receive the fruit after being cleaned, said drying means including a traveling conveyor for the fruit, and brushes above the conveyor adapted to brush water from the fruit on said conveying means; together with a traveling belt above said brushes on to which belt water is adapted to be splashed by the brushes.

2. In a machine of the class described, means to cause the fruit to travel, means to direct cleaning liquid to the fruit while on the first traveling means, and a drying assemblage adapted to receive the fruit after being cleaned, said drying means including a traveling conveyor for the fruit, and brushes above the conveyor adapted to brush water from the fruit on said conveying means; together with a traveling belt above said brushes on to which belt water is adapted to be splashed by the brushes, and means to bend the brushes in such a direction that their reaction in restoring themselves to normal position will cause centrifugal force to splash the water on to said belt.

3. A unitary apparatus for removing poisonous residue from fruit and applying a protective coating thereto comprising in combination, conveying means, washing means and rinsing means, a drying means comprising a conveyor for fruit, rotary drying means for contacting with fruit on said conveyor to remove moisture therefrom, movable means adjacent thereto to collect the accumulated moisture from said rotary drying means, coating means following said drying means comprising rotary means for contacting with fruit and depositing a protective coating thereon, means for supplying coating material to said rotary means, the said conveyor serving fruit to said drying means and said coating means without change.

4. A unitary apparatus for removing poisonous residue from the surfaces of fruit and then applying a protective coating thereto comprising in combination, conveying means, poisonous residue removing means and cleansing means, rotary drying means for contacting with fruit on said conveying means, a traveling conveyor means for receiving moisture from said rotary means, rotary coating means contacting with fruit following the drying thereof to deposit a protective coating thereon, coating material supported by said rotary coating means and receiving a deposit therefrom to apply to said fruit, the conveyor moving fruit adjacent said drying means also moving the same fruit adjacent the said coating means.

5. A unitary apparatus for removing poisonous residue from fruit and then applying a coating of protective material thereto comprising in combination, conveying means, poisonous residue removing means and cleansing means, drying means comprising rotary brushes for contacting with fruit on said conveying means to take moisture therefrom, fixed means for intercepting said brushes in their rotation and causing a flexure thereof to throw the collected moisture therefrom, moving means for collecting the moisture thrown from said brushes and conveying it away from said drying means with means following said operation for applying a protective coating to said fruit.

6. A unitary apparatus for removing poisonous residue from fruit and then applying a coating of protective material thereto comprising in combination means for removing said residue and for delivering said fruit cleansed of undesirable material, a drying station consisting of a conveyor with rotary elements for turning fruit over and over, a series of overlapping brushes for contacting with fruit on said conveyor and spreading a protective coating thereon, means for supplying coating material to said brushes comprising rolls of coating material entirely supported by said brushes and rolling in contact therewith.

7. An apparatus for drying fruit comprising a conveyor for moving fruit, rotary brushes located over said fruit and contacting therewith to remove moisture therefrom, fixed means for intercepting said brushes in their rotation to cause them to throw the collected moisture therefrom, means adjacent thereto for receiving said projected moisture and conveying it away from said brushing means.

8. An apparatus for drying fruit comprising a conveyor for moving fruit, a series of groups of overlapping rotary brushing means for contacting with fruit on said conveyor and collecting moisture therefrom, fixed means for curving around said overlapping brushes to cause a flexure of the bristles thereof, the reaction of said bristles throwing the collected moisture therefrom, horizontally moving means for receiving the moisture as thrown from said brushes and conveying it away therefrom.

Signed at Toppenish, in the county of Yakima, and State of Washington, this fifth day of March, A. D. nineteen hundred and twenty-eight.

ANDREW O. MOE.